April 19, 1960 C. W. MUSSER 2,932,986
STRAIN WAVE GEAR-SPECIES IN WHICH ONLY
ONE OF THE GEARS IS INPUT
Filed March 23, 1959 3 Sheets-Sheet 2
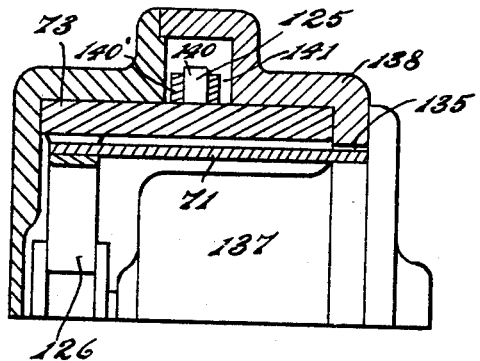
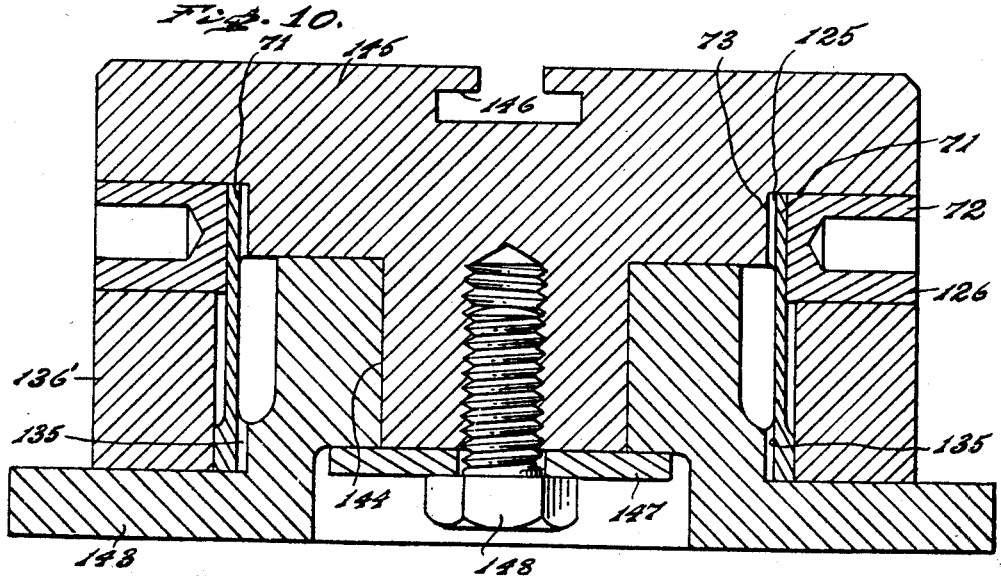
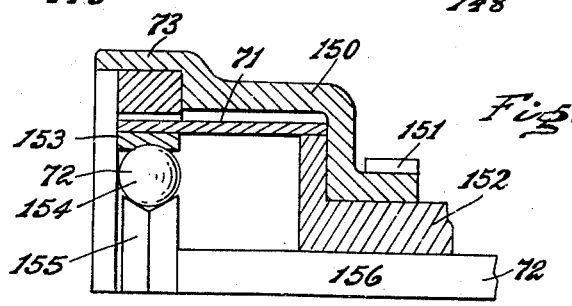
INVENTOR
C. Walton Musser
BY
ATTORNEYS.

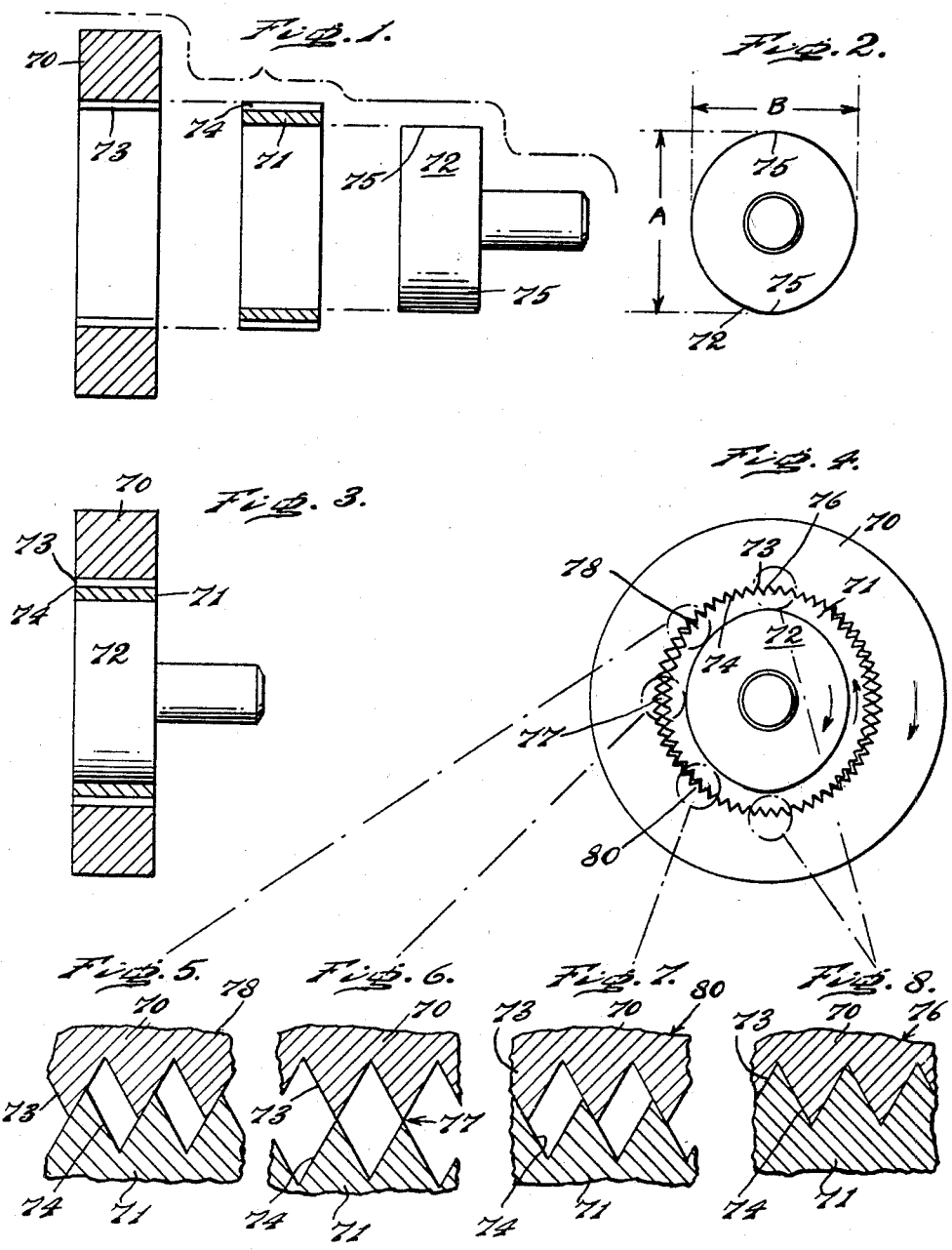

April 19, 1960

C. W. MUSSER 2,932,986

STRAIN WAVE GEAR-SPECIES IN WHICH ONLY ONE OF THE GEARS IS INPUT

Filed March 23, 1959

United States Patent Office 2,932,986
Patented Apr. 19, 1960

2,932,986
STRAIN WAVE GEAR-SPECIES IN WHICH ONLY ONE OF THE GEARS IS INPUT

C Walton Musser, Beverly, Mass., assignor to United Shoe Machinery Corporation, Flemington, N.J., and Boston, Mass., a corporation of New Jersey Original application March 21, 1955, Serial No. 495,479, now Patent No. 2,906,143, dated September 29, 1959. Divided and this application March 23, 1959, Serial No. 801,193

7 Claims. (Cl. 74—665)

The present invention relates to motion transmitting mechanism, and particularly to gearing in which relative motion occurs between an internal gear and a cooperating external gear.

The present application relates to species of my parent application Serial No. 495,479, filed March 21, 1955, for Strain Wave Gearing, now U.S. Patent No. 2,906,143, granted September 29, 1959, in which one of the strain gear or ring gear constitutes the input. The parent application is incorporated herein by reference. The reader is referred to this patent for a general description of the subject matter of the invention and a basic understanding of its principles.

The species of the parent application relating to the dual form and to the electromagnetic strain-inducer is embodied in my copending application Serial No. 656,572, filed May 2, 1957, for Dual Strain Wave Gearing.

A purpose of the invention is to secure relative motion between cooperating internal and external gears, by propagating a strain wave which advances an area of contact or preferably a plurality of areas of contact between the respective gears.

A further purpose is to obtain freedom from backlash in gearing and desirably also to make the extent of backlash adjustable.

A further purpose is to obtain extremely precise transmission of motion by gearing or similar mechanisms.

A further purpose is to maintain a large percentage of the teeth of two cooperating gears in contact at any one time, preferably more than 50% of each.

A further purpose is to secure low pitch line velocity in gearing systems.

A further purpose is to avoid concentration of wear on individual teeth, and particularly to distribute the wear uniformly over all the teeth in a gearing system.

A further purpose is to operate gearing with very small tooth motion.

A further purpose is to operate gearing with a very low tooth sliding velocity.

A further purpose is to balance the forces in gearing, and thereby reduce or eliminate any lateral components external to the system.

A further purpose is to develop the power in a gearing system at the point of greatest leverage.

A further purpose is to obtain a large angle of action in gearing.

A further purpose is to secure surface contact rather than point contact or line contact, between teeth of cooperating gears, and desirably also to maintain a relatively large surface of contact for a succession of tooth positions.

A further purpose is to bring gear teeth into mesh by surface sliding in one direction only.

A further purpose is to operate gearing with sinusoidal tooth motion.

A further purpose is to secure a wide variety of available gear reductions by variations in gearing of the same design, and especially to obtain very large gear reductions.

A further purpose is to obtain gear ratios in the range between 10 to 1 and 1 million to 1 from a gearing system.

A further purpose is to obtain a very wide and preferably unlimited ratio selection.

A further purpose is to produce a gearing system with large torque capabilities.

A further purpose is to secure relatively low tooth contact pressures, and thereby minimize the tendency to excessive load concentrations on certain portions of the teeth.

A further purpose is to largely avoid varying loads by virtue of force components produced from gear action.

A further purpose is to operate the gearing with low shear stresses throughout.

A further purpose is to secure a high efficiency on high gear ratios.

A further purpose is to obtain torsional rigidity of the output of a gear train or system.

A further purpose is to secure a gearing system with a high degree of adaptability, and very few parts.

A further purpose is to obtain ease of lubrication in gearing.

A further purpose is to manufacture gearing of very small size, and correspondingly light weight.

A further purpose is to produce gearing by simple manufacturing methods.

A further purpose is to obtain quiet operation of gearing.

A further purpose is to provide a coaxial relationship between input and output in a gearing system.

A further purpose is to avoid difficulty from problems relating to center distance.

A further purpose is to produce a gearing system which is insensitive to misalignment between input and output.

A further purpose is to obtain differential motion which is insensitive to eccenticity and to tooth shape.

A further purpose is to distribute the input stresses at a different location from the output stresses in a gearing system.

A further purpose is to propagate the strain wave mechanically, electrically or by other suitable means.

Further purposes appear in the specification and in the claims.

In the drawings I have chosen to illustrate a few only of the numerous embodiments in which my invention may appear, selecting the forms shown from the standpoints of convenience in illustration, satisfactory operation, and clear demonstration of the principles involved.

Figure 1 is an exploded axial section of a device for transmitting motion according to the present invention, in a simplified form.

Figure 2 is a right end elevation of the strain inducer shown in Figure 1.

Figure 3 is an axial section corresponding generally to the exploded section of Figure 1, but showing the parts assembled in their normal operating relationship.

Figure 4 is a right end elevation of the assembly of Figure 3.

Figures 5 to 8 inclusive are enlarged developed fragmentary sections transverse to the axis showing the relative relations of the teeth at various positions in Figure 4, as indicated by the corresponding section lines.

Figures 9 and 10 show in fragmentary axial sections variants in the arrangement of the components of the strain wave gearing of the invention.

Figure 11 is a diagrammatic axial half section showing a variation in the device of the invention.

Figure 12:
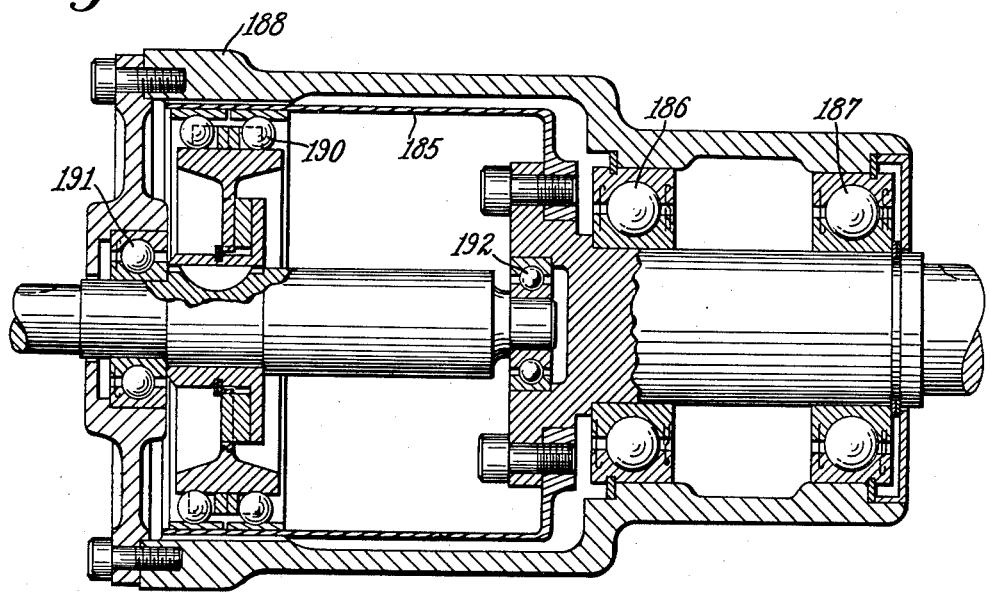

Figure 12 is an axial section of an embodiment according to the invention in which the strain gear rotates and constitutes the input, the strain inducing element rotates and constitutes the output and the ring gear is stationary.

Figure 13:
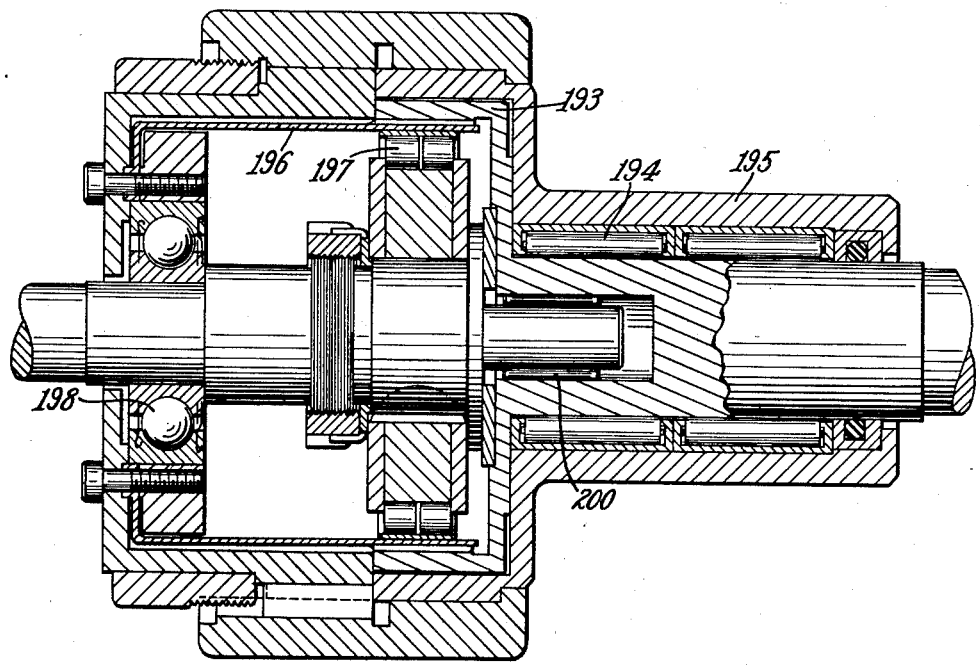

Figure 13 is an axial section of a device according to the invention in which the ring gear rotates and constitutes the input, the strain inducing element rotates and constitutes the output and the strain gear is stationary.

Describing in illustration, but not in limitation and referring to the drawings:

General features of invention

The present invention is concerned with eliminating difficulties encountered in conventional gearing, as will be explained more in detail later. The present invention deals particularly with gearing of a character in which inner and outer concentric gears are brought into mating relationship in a plurality of spaced areas, with interspersed areas in which they are not in mating relationship, and the areas of mating relationship are propagated forward in a wave which for the purposes of the present invention is described as a strain wave, since it represents a wave deflection in one of the gearing elements.

This strain wave is actually superimposed on the circumference of one or both of the gears, and travels with respect to it at a rate which is determined by the rate of application of load or rotatory force to the mechanism.

It should be appreciated that in the mechanism of the present invention, unlike all ordinary gearing, two cooperating gears move into and out of tooth engagement by radial motion of the teeth of one gear with respect to the other, without in the least necessitating any change in the gear axis. It will be evident, therefore, that this action presupposes a motion of parts of one of the gears with respect to other parts which can be accomplished in any suitable manner, but preferably will be achieved by deflecting an elastic material, which may be for example an elastomer such as rubber, synthetic rubber, nylon, or other plastic, or a metal such as steel, bronze, or other gear material, moving within the elastic limit, and thereby substantially free from plastic deformation.

It will, however, be understood that the principles of the invention are applicable to any suitable mechanism which applies the propagated wave inducing mating engagements according to the disclosure of the invention.

Principles of operation

Strain wave gearing is a novel system for transmitting motion and power, in which the gear tooth engagement is induced at a plurality of points by the deflection of a thin ring gear or the like. The tooth engagement at a plurality of points around the circumference is propagated along the periphery of the thin ring gear as the crest of the induced deflection wave is made to move around this periphery. As the deflection moves around the gear, each tooth moves radially in and out of engagement as it progresses from one tooth to the next, tracing during this motion a curve which is generally of the character of a sinusoidal wave, giving rise to the term "strain wave gearing."

In the simplest form as shown for example in Figures 1 to 8, inclusive, the motion transmitting device consists of a ring gear 70, a strain gear 71, and a strain inducer 72. The ring gear has internal teeth 73 in the illustration shown, which are preferably of axially extending character. In this form the strain gear 71 has external teeth 74 which also preferably extend axially and at the same diametral pitch as the teeth on the ring gear but have a slightly smaller pitch diameter. This difference in pitch diameter is caused by the fact that the number of teeth in this case on the strain gear is less than the number of teeth on the ring gear. The difference in the number of teeth between the two gears, or the tooth differential, should be equal to or a multiple of the number of places at which the strain gear is deflected to cause tooth engagement with the ring gear. This differential would desirably be two, using a strain inducer having an elliptical contour with two lobes 75, as shown in Figures 1 and 2. As already explained, the strain gear 71 is made of a material which is elastic under the conditions of operation, and in the case of a steel strain gear, is made of relatively thin cross section so that it can be deflected easily in a radial direction.

The form of strain inducer for transmitting motion as illustrated in Figures 1 to 8 is a very simple one having two points of strain engagement of the strain gear. The strain inducer 72 has an elliptical contour, as already explained, whose major axis A is larger than the inside diameter of the strain gear 71 by an amount approximately equal to the difference in pitch diameter of the ring gear and the strain gear. The minor axis B is smaller than the inside diameter of the strain gear by approximately the same amount. When the strain inducer is inserted into a position inside the strain gear, as shown in Figure 3, it causes the strain gear to be distorted into elliptical form, with the pitch line of the teeth at the major axis equal to the pitch diameter of the ring gear as shown at 76 in Figures 4 and 8. At the position as shown in Figure 8 the pitch circles of the two gears are coincident. At the minor axis the pitch line of the strain gear teeth is smaller than the pitch diameter of the ring gear, and if a full tooth height is used, the teeth will just clear one another as shown at 77 in Figures 4 and 6. At intermediate points 78 and 80 as shown in Figures 4, 5 and 7, the teeth will have varying degrees of engagement. This condition prevails where the tooth differential is equal to the number of lobes on the strain inducer which in this case is two.

In the analysis so far, it has been assumed that the strain inducer is the driving element. Since, however, strain wave gearing can be made to have a relatively high mechanical efficiency, any of the three elements can be utilized as the driving element with either of the remaining elements as the driven element. For example, the strain gear may be stationary, with the ring gear the driver, and the strain inducer driven. When used in this manner, the driven strain inducer makes 100 revolutions for every revolution of the driving ring gear.

Likewise it will be evident that with the ring gear the input or driving gear, the strain inducing element may be stationary with respect to rotation and the strain gear is relatively rotated thereby.

Furthermore, with the ring gear the input or driving gear, both the strain gear and the strain inducing element can in another form be driven thereby.

While we have in this initial simplified analysis assumed a condition in which the strain inducer is internal and the strain gear is located outside the strain inducer and inside the ring gear, it will be evident as later explained that these features can be reversed, for example placing the strain inducer on the outside, and the strain gear inside it, and the ring gear on the very inside.

Distinctive features

The radically different principles upon which the operation of strain wave gearing depends produces parameters differing considerably from those normal for conventional gearing.

The reader is referred to my patent aforesaid for the detailed discussion of the distinctive features.

It will be evident that in accordance with the invention where the strain gear is an input or driving element, the ring gear may be stationary or may be driven and constitute the output, or the strain inducing element may be stationary or be driven and constitute the output, or both the ring gear and the strain inducing element may be driven and constitute the output.

Figure 9 shows a very compact construction illustrating the combination of an electric motor 137 with strain wave gearing to produce a gear reduction in a compact form which might be used, for example, in a chain hoist or linear actuator. Here the ring gear 73 is the driven or output element and the strain gear 71 is held in place as by splines at 135 engaged with cooperating splines in the housing 138. The input is through the strain gear. The ring gear 73 on the outside carries sprocket teeth 140 which engage a chain 140' of the hoist and function as the output. The housing desirably includes a channel 141 through which the sprocket teeth are carried. It will be evident that the motor shaft directly carries and operates the strain inducer 126.

All of the above descriptions of strain wave gearing have referred to the standard form. This is a form in which the strain inducer is internal with respect to the strain gear and the ring gear is external with respect to the strain gear. There are some applications, however, where it is desirable to invert the parts, by placing the strain inducer on the outside and the so-called ring gear on the inside. The same principles regarding types of strain inducer as already described can be followed, except that the strain inducers are merely inverted, placing parts on the inside which were formerly on the outside and parts on the outside which were formerly on the inside. In effect this turns the strain inducer "inside out."

Figure 10 illustrates one of many possible examples of inverted strain wave gearing, and it will be understood that these same principles can be applied to invert any one of the other forms. The particular example illustrates a rotary table, work support, or machine support, which is used for circular indexing. The drawing shows a base 143 which has a bearing 144 providing a rotational mount for a table 145 provided with the usual work attaching T-slot means 146. In Figure 10 the strain gear 71 is splined at the opposite end at 135 to engage the cooperating splines on the base 143, and is held in place by ring 136' which makes a force fit around the strain gear. The strain gear internally engages external teeth on the inverted so-called ring gear 73 provided on the outside of the rotary table 145. A plain bearing strain inducer is conveniently used in this form as it is desirable to take advantage of the frictional engagement to make the table self-locking. When the strain inducer 72 is circular on the outside diameter, it is machined on the inside with a slight eccentricity so as to produce the desired strain wave in the strain gear. The interior is purposely machined to produce a slightly excessive deflection so that it will positively assure complete absence of backlash by spring loading the strain gear. This will cause a slight unobjectionable distortion in the strain inducer ring when it is assembled. Since all the parts are inverted, the teeth on the strain gear are on the inside and the mating teeth on the table are external as just explained. The strain inducer is suitably provided with index marks and these are read to a reference line on the forced fit ring 136'. With this design the ratio between the strain inducer and the table can be made in the range from about 90 to 1 to 360 to 1. With 360 to 1 as the ratio and an 8 inch table the index marks for ten second graduations are more than 1/16 inch apart, thus assuring an extremely precise adjustment. The rotary table has extreme rigidity and zero backlash so that machine operations can be performed in the various positions or settings of the table without the necessity to provide external locking devices. It will, however, be understood that external locking can be employed if desired. In order to further assure a relatively tight fit, the table is held down on the base by a washer 147 secured by a bolt 148, and the washer will desirably be a Belleville washer or Belleville spring to provide preload of the bearing in the axial direction.

Figure 11 shows a device according to the invention in which the ring gear 73 is supported by a rotatable housing 150 having a gear 151 which is driven to provide the input. Rotatable coaxial of the ring gear within it is a strain gear 71 according to the invention which is secured to a tubular shaft 152. Inside the strain gear 71 is a race 153 concentric with the axis and carrying balls 154 of a strain inducer 72, the interior of the bolts being acted on by a strain inducer race 155 mounted on a shaft 156 concentric with the shaft 151 and relatively rotatable within it. The strain inducer 155 conforms to a sine wave contour having two lobes or three lobes as previously described, preferably two lobes. Either the shaft 152 or the shaft 156 is held stationary in the preferred operation, in which case the other one is driven as the output. If both the shafts 152 and 156 are free to turn both are driven as the output.

In Figure 12 I show a strain gear 185 journalled in bearings 186 and 187 which is turning within a stationary ring gear 188. The strain gear is deflected according to the present invention by a strain inducer 190 turning on a bearing 191 which is mounted on the ring gear and a bearing 192 which is mounted axially on the strain gear. Thus, in this case, the input is through the strain gear and the output is through the strain inducer.

Figure 13 illustrates a device according to the invention in which the ring gear 193 is journalled in bearings 194 in a housing 195. Strain gear 196 is mounted stationary in the housing. The input is through the ring gear. The output is through strain inducer 197 which is axial and is journalled in bearing 198 in the housing and in bearing 200 in the ring gear. The strain inducer propagates a wave according to the present invention.

It will be evident that in any case where an input and output are designated, in the above description, the device will be equally effective if it is reversed and the output becomes the input and the input becomes the output.

In view of my invention and disclosure, variations and modifications to meet individual whim or particular need will doubtless become evident to others skilled in the art to obtain all or part of the benefits of my invention without copying the structure shown, and I, therefore, claim all such insofar as they fall within the reasonable spirit and scope of my claims.

Having thus described my invention what I claim as new and desire to secure by Letters Patent is:

1. In a device for transmitting motion, a first gear, a second gear of different diameter from the first gear having teeth of the same size as the first gear, concentric therewith and having a deflectable wall, a strain inducing element operative to deflect the second gear and maintaining the second gear deflected into mating relation of its teeth with the teeth of the first gear at a plurality of circumferentially spaced positions interspaced by nonmating positions, and means for moving the operative relation of the strain inducing element relative to the periphery of the second gear and thereby propagating the strain wave around the periphery of the second gear and causing relative rotation of the second gear with respect to the first gear, including means for driving one of the gears as an input to drive one of the other gears and the strain inducing element as an output.

2. A device of claim 1, in which the first gear is stationary with respect to rotation and the strain inducing element is caused to rotate.

3. A device of claim 1, in which the strain inducing element is stationary with respect to rotation and the first gear is caused to rotate.

4. A device of claim 1, in which both the first gear and the strain inducing element are relatively rotated by the second gear.

5. A device of claim 1, in which the strain inducing element is stationary with respect to rotation, and the second gear is relatively rotated thereby.

6. A device of claim 1, in which the second gear is stationary with respect to rotation and the strain inducing element is relatively rotated thereby.

7. A device of claim 1, in which the first gear is driven and both the second gear and the strain inducing element are relatively rotated thereby.

No references cited.